United States Patent [19]
Yamagishi et al.

[11] Patent Number: 5,323,825
[45] Date of Patent: Jun. 28, 1994

[54] PNEUMATIC TIRES

[75] Inventors: Naoto Yamagishi, Kodaira; Shinji Usui, Tokyo, both of Japan

[73] Assignee: Bridgestone Corporation, Tokyo, Japan

[21] Appl. No.: 908,647

[22] Filed: Jul. 6, 1992

Related U.S. Application Data

[63] Continuation of Ser. No. 608,436, Nov. 2, 1990, abandoned.

[30] Foreign Application Priority Data

Nov. 10, 1989 [JP] Japan .................. 1-293429

[51] Int. Cl.$^5$ .............................................. B60C 11/04
[52] U.S. Cl. .......................... 152/209 R; 152/209 B
[58] Field of Search ........... 152/209 R, 209 B, 209 D, 152/454

[56] References Cited

U.S. PATENT DOCUMENTS

| 3,586,086 | 6/1971 | Boileau | 152/209 R |
| 4,044,810 | 8/1977 | Taniguchi et al. | 152/209 R |
| 4,442,879 | 4/1984 | Uemura | 152/209 R |
| 4,480,671 | 11/1984 | Giron | 152/209 R |
| 4,589,461 | 5/1986 | Ohkuni et al. | 152/209 R |
| 4,724,878 | 2/1988 | Kabe et al. | 152/209 R |
| 4,757,850 | 7/1985 | Nakasaki et al. | 152/209 R |

FOREIGN PATENT DOCUMENTS

| 0256247 | 2/1988 | European Pat. Off. | 152/209 R |
| 0285695 | 10/1988 | European Pat. Off. | |
| 1150295 | 6/1963 | Fed. Rep. of Germany. | |
| 0064003 | 4/1985 | Japan | 152/209 R |
| 0244605 | 12/1985 | Japan | 152/209 R |
| 0143205 | 6/1986 | Japan | 152/209 R |
| 61-143205 | 6/1986 | Japan. | |
| 0295702 | 12/1987 | Japan | 152/454 |
| 0134313 | 6/1988 | Japan | 152/209 R |
| 0095911 | 4/1989 | Japan | 152/209 D |
| 1095911 | 4/1989 | Japan | 152/209 R |
| 0215605 | 8/1989 | Japan | 152/209 D |

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A pneumatic tire comprising a tread, wherein at least one circumferential groove having a width not greater than 0.1 times as much as that of the tread is formed in at least one end portion of the tread, thereby forming at least one narrow rib having a width not more than 0.2 times as much as that of the tread, and at least one of the above at least one narrow rib is projected radially outwardly from an extension line of a contour line of the tread by 0.3 times of a gauge of the tread at the maximum.

14 Claims, 6 Drawing Sheets

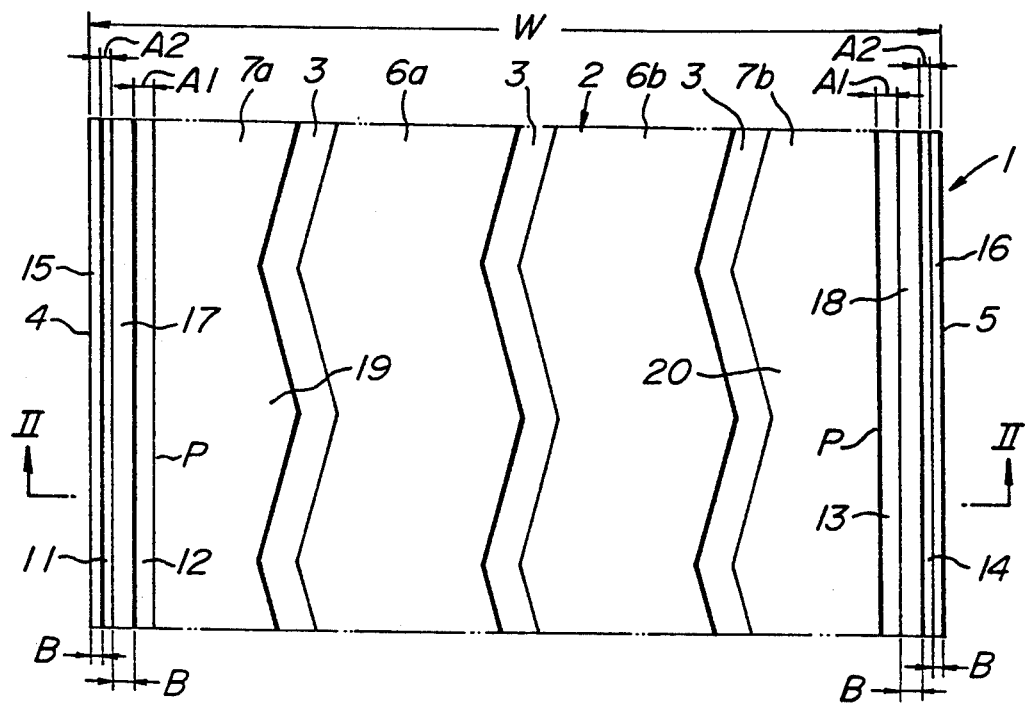
FIG._1
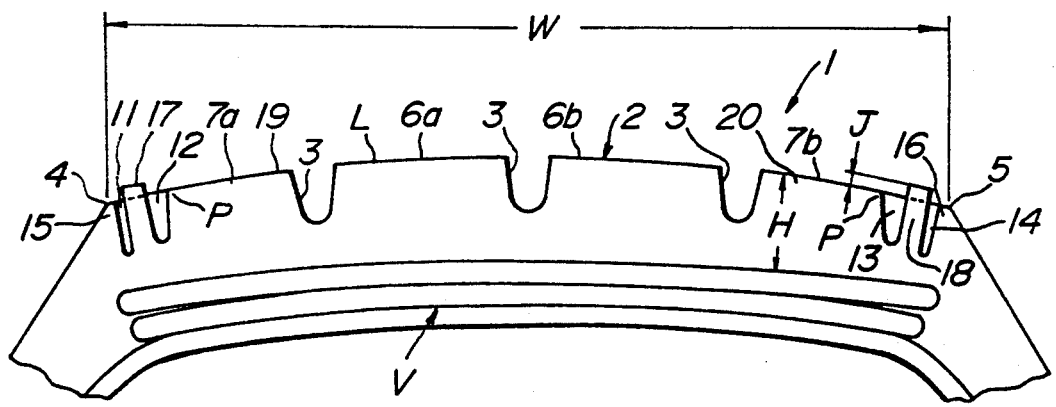
FIG._2

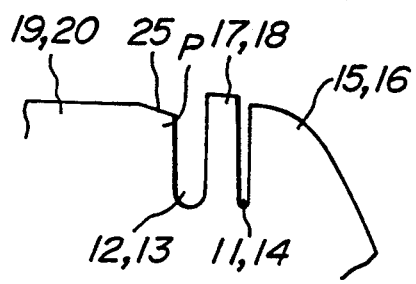
FIG_3
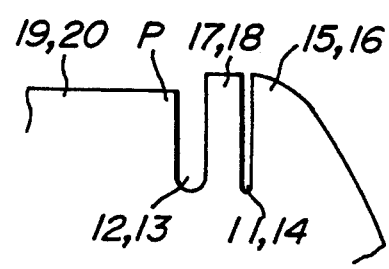
FIG_4
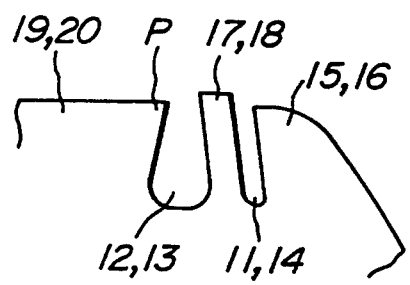
FIG_5
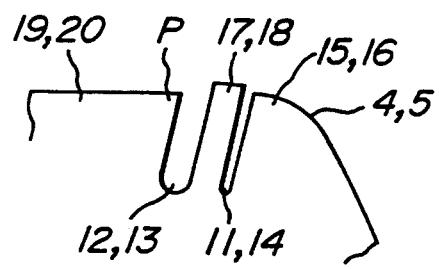
FIG_6

FIG_7
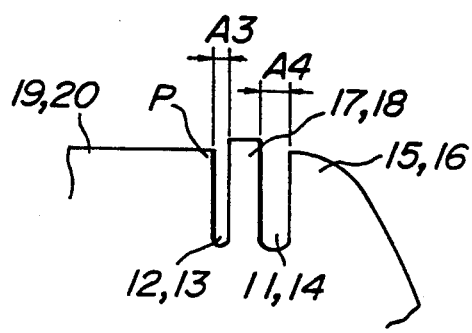
FIG_8
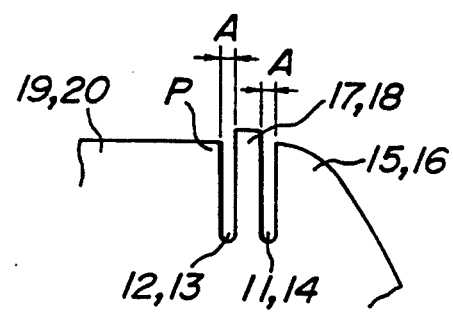
FIG_9
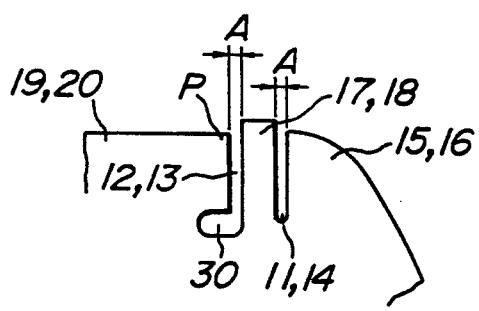
FIG_10
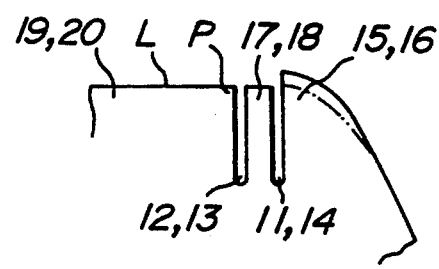

FIG_11
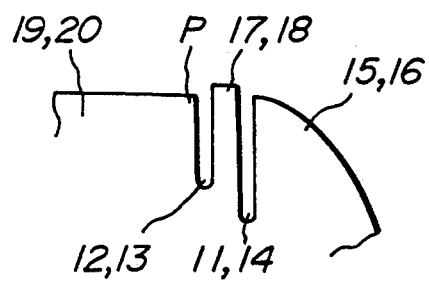
FIG_12
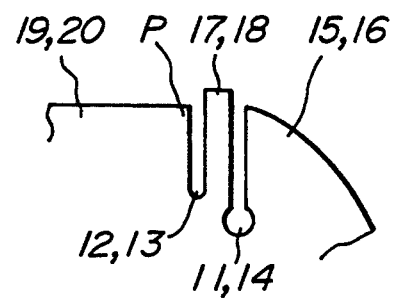
FIG_13
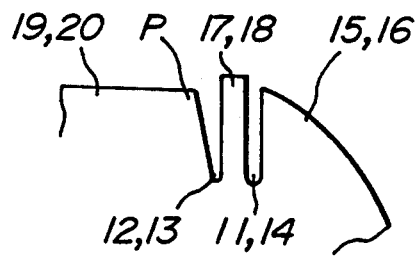

FIG_14
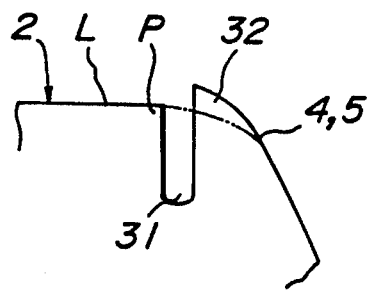
FIG_15
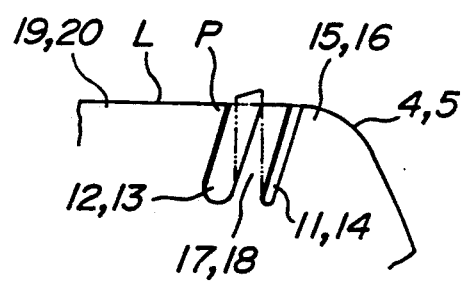

FIG_16
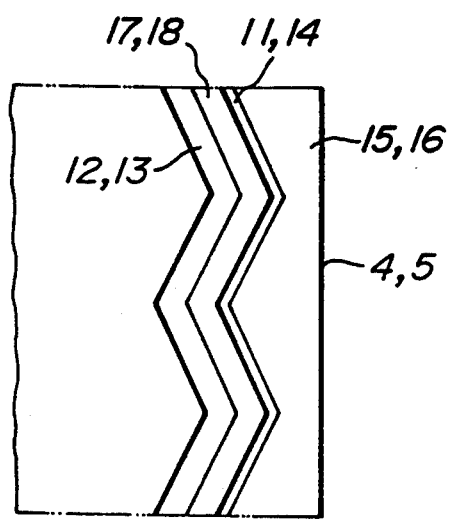
FIG_17
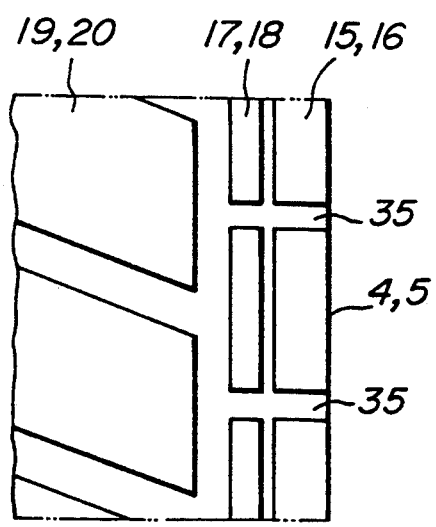
FIG_18
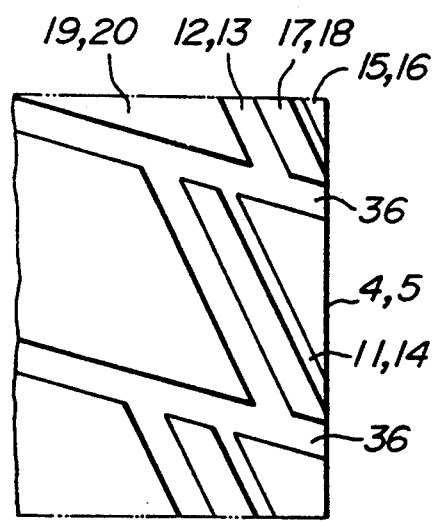

PNEUMATIC TIRES

This is a Continuation of application Ser. No. 07/608,436 filed Nov. 2, 1990 now abandoned.

BACKGROUND OF THE INVENTION

1. Field of the Invention

The present invention relates to pneumatic tires which can prevent uneven wearing at end portions of treads.

2. Related Art Statement

As Pneumactic radial tires capable of preventing uneven wearing at the end portions of the treads are concerned tires are known. Such are described in Japanese Patent application Laid-open No. 61-143,205. In the tires of this type, each of the shoulder ribs provided in the end portions of the tread is divided into two narrow ribs by forming a circumferential groove having given width, depth and interval in the shoulder rib. When this pneumatic tire receives lateral forces, the ground contact pressure is made uniform through lateral deformation of the narrow ribs, so that occurrence of local wear acting as a core of uneven wear can be controlled.

However, in the case of such a tire, since the radially outer portion of the narrow rib is in the same level as the contour line of the tread, that is, since the radially outer portion of the other shoulder ribs not divided is in the same level as that of the center rib, the laterally deformed amount of the narrow rib is substantially the same small value as that of the center rib when the tire receives the lateral forces. As a result, it cannot be said that the effect of controlling the occurrence of the above local wearing is sufficient.

SUMMARY OF THE INVENTION

The present invention is directed to provide pneumatic tires in which uneven wearing at end portions of a tread can effectively be prevented by assuredly preventing local wearing as a core of the uneven wearing.

The object of the present invention can be accomplished by the pneumatic tire comprising a tread, wherein at least one circumferential groove having a width not greater 0.1 times as much as that of the tread is formed in at least one end portion of the tread, thereby forming at least one thin rib having a width not greater than 0.2 times as much as that of the tread, and at least one of said at least one narrow rib is projected radially outwardly from an extension line of a contour line of the tread by 0.3 times of a gauge of the tread at the maximum.

In general, uneven wearing at the end portion of the tread, such as edge-drop wearing, wavy wearing, shoulder-drop wearing or polygonal wearing occurs, starting from occurrence of local wearing due to rapid increase in the share of the lateral forces by the end portion of the tread upon receipt of lateral forces during cornering or the like and next spreading of such local wearing in every direction as a core.

For this reason, in the present invention, at least one circumferential groove is provided in the end portion of the tread so that at least one narrow rib having a given width is formed. As a result, when the tire receives lateral forces during cornering or the like, the narrow rib having low rigidity is laterally deformed in an acting direction of the lateral forces (in the widthwise inward direction of the tire) to make the ground contact pressure uniform near the narrow rib. Thereby, occurrence of local wearing at a land portion located widthwise inside the narrow rib is prevented. At this time, since at least one of the narrow ribs is projected radially outwardly from the extension line of the contour line of the tread in the present invention, the laterally deformed amount of the narrow rib becomes greater than the deformed amount of the land portion located near the narrow rib. Consequently, the occurrence of the local wearing of the land portion located widthwise inside the narrow rib can assuredly be prevented. Accordingly, since the occurrence of the local wearing is prevented as mentioned above, the local wearing can be effectively prevented from occurring at the end portion of the tread.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 1 is a developed view of a tread as a first embodiment of the present invention;

FIG. 2 is a sectional view of FIG. 1 as viewed from an arrow direction of II—II;

FIG. 3 is a partially sectional view of a second embodiment of the present invention along a meridian line;

FIG. 4 is a partially sectional view of a third embodiment of the present invention along a meridian line;

FIG. 5 is a partially sectional view of a fourth embodiment of the present invention along a meridian line;

FIG. 6 is a partially sectional view of a fifth embodiment of the present invention along a meridian line;

FIG. 7 is a partially sectional view of a sixth embodiment of the present invention along a meridian line;

FIG. 8 is a partially sectional view of a seventh embodiment of the present invention along a meridian line;

FIG. 9 is a partially sectional view of an eighth embodiment of the present invention along a meridian line;

FIG. 10 is a partially sectional view of a ninth embodiment of the present invention along a meridian line;

FIG. 11 is a partially sectional view of a tenth embodiment of the present invention along a meridian line;

FIG. 12 is a partially sectional view of an eleventh embodiment of the present invention along a meridian line;

FIG. 13 is a partially sectional view of a tread as a twelfth embodiment of the present invention;

FIG. 14 is a partially sectional view of a tread as a thirteenth embodiment of the present invention;

FIG. 15 is a partially sectional view of a tread as a fourteenth as an embodiment of the present invention;

FIG. 16 is a partially plan view of a fifteen embodiment of the present invention along a meridian line;

FIG. 17 is a partially plan view of a sixteenth embodiment of the present invention along a meridian line; and FIG. 18 is a partially plan view of a seventeenth embodiment of the present invention along a meridian line.

DETAILED DESCRIPTION OF THE INVENTION

The first embodiment of the present invention will be explained with reference to the drawings.

In FIGS. 1 and 2, a reference numeral 1 denotes a pneumatic radial tire in which a plurality (three in this embodiment) of main grooves 3 circumferentially extend and are bent zigzag in a surface of a tread 2 of the tire 1. Each of the main grooves 3 has such a width such that groove walls thereof may not contact each other even at a ground contact zone during rotation of the tire 1 under load. When a plurality of the main grooves 3 are formed in the tread 2 as mentioned above, two circumferentially extending center ribs 6a and 6b are formed in the tread 2 between these main grooves 3, while two shoulder ribs 7a and 7b are formed between the axially outermost main grooves 3 and the ends 4 and 5 of the tread. At least one (two in this embodiment) straight extending, circumferential grooves (11, 12, 13 and 14) are formed in each of widthwise opposite end portions of the tread 2, i.e., in each of widthwise outer portions of the shoulder ribs 7a and 7b in this embodiment. As a result, narrow ribs 15 and 16 are defined between the circumferential groove 11 and the end 4 of the tread and between the circumferential groove 14 and the end 5 of the tread, respectively. On the other hand, narrow ribs 17 and 18 are defined between the circumferential grooves 11 and 12 and between the circumferential grooves 13 and 14, respectively. Further, remaining ribs 19 and 20 are defined as land portions between the circumferential groove 12 and the adjacent main groove 3 and between the circumferential groove 13 and the adjacent main groove 3, respectively. The circumferential grooves 11, 12, 13 and 14 only have extend in the substantially circumferential direction, not in a strictly circumferential direction.

The width A of each of the circumferential grooves 11, 12, 13 and 14 is set at not more than 0.1 times that W of the tread. The reason is that if the former exceeds 0.1 times the latter, the narrow ribs 15 and 17 and the narrow ribs 16 and 18 are spaced too Fat from the widthwise outermost portions P of the remaining ribs 19 and 20, respectively. Consequently, the narrow ribs 15, 16, 17 and 18 do not influence the remaining ribs 19 and 20 as mentioned later, so that the uneven wearing-preventing effect cannot be expected. Further, the width B of each of the narrow ribs 15, 16, 17 and 18 is set at not more than 0.2 times that W of the tread. The reason is that if the former is more than 0.2 times the width W of the tread, the bending rigidity of the narrow ribs 15, 16, 17 and 18 becomes so high that the narrow rib 15, 16, 17 or 18 is not almost laterally deformed even upon receipt of lateral forces. Consequently, the effect of preventing uneven wearing cannot be expected. It is preferable that the width B of each of the narrow ribs 15, 16, 17 and 18 is in a range of 0.01 times to 0.1 times as that W of the tread. The reason is that if the former is less than 0.01 times, the ground contact pressure cannot greatly be made uniform due to low lateral rigidity of the narrow ribs 15, 16, 17 and 18, even when the narrow ribs 15, 16, 17 and 18 are laterally deformed. On the other hand, if the width B is more 0.1 times the width W, the rigidity of the narrow ribs 15, 16, 17 and 18 increases to some extent, so that the laterally deformed amount thereof upon receipt of the lateral forces are suppressed, and it cannot be said that the uneven wearing-preventing effect is sufficient. If such a tire is subjected to cornering, it is considered that the share of the lateral forces by the widthwise end portion of the tread 2 rapidly increases upon receipt of the lateral forces so that local wearing occurs as a core of uneven wearing. However, in this embodiment, since the narrow ribs 15, 16, 17 and 18 having the specified width B are defined by forming the circumferential grooves 11, 12, 13 and 14 having the specified width A in the widthwise end portions of the tread 2 as mentioned above, the narrow ribs 15, 16, 17 and 18 having the low rigidity are laterally deformed in the acting direction of the lateral forces (widthwise inward direction) upon receipt of the lateral forces as mentioned above. As a result, the land portions near the narrow ribs 15 and 17 and the narrow ribs 16 and 18, i.e., the widthwise outer end portions of the remaining ribs 19 and 20 in this embodiment are influenced by lateral deformation of the narrow ribs 15, 16, 17 and 18, so that the ground contact pressure distribution is made uniform. Consequently, occurrence of local wear in the widthwise outer end portions P of the remaining ribs 19 and 20 is prevented. Further, at least one narrow rib (only the widthwise innermost narrow ribs 17 and 18 in this embodiment) among the narrow ribs 15, 16, 17 and 18 is projected radially outwardly from the extension line of the contour line L of the tread. The contour line L of the tread is an arc of the contour of the tread 2 in a radial section. The radially. outwardly projecting amount J of the narrow rib 17, 18 is up to a maximum value of 0.3 as of the gauge H of the tread. The reason is that if the projecting amount J is more than 0.3 times the gauge H of the tread, the radially outwardly projecting end portions of the narrow ribs 17 and 18 are easily cut during running of the tire 1. The gauge H of the tread means the radial distance from a radially outer surface of the belt layer V or an extension surface of this radially outer surface to the outer surface of the tread 2. The projecting amount J is preferably not less than 0.02 times as much as the gauge H of the tread. The reason is that if it is less than 0.02 times, the uneven wear-preventing effect mentioned later is insufficient. Since the narrow ribs 17 and 18 are projected radially outwardly from the extension line of the contour line L of the tread by the specified amount, the laterally deformed amount of the narrow rib 17, 18 is greater than that of the land portion positioned adjacent the narrow rib 17, 18, i.e., the remaining ribs 19, 20 when the tire receives lateral forces, occurrence of uneven wear at the widthwise outer end portions P of the land portions located widthwise inside the narrow ribs 17 and 18, i.e., the remaining ribs 19 and 20 in this embodiment, can assuredly be prevented. In this embodiment, since the widthwise innermost narrow ribs 17 and 18, which are nearest the land portions (the remaining ribs 19 and 20 in this embodiment) among the narrow ribs 15, 16, 17 and 18 and can thus greatly influence the land portions, are projected, occurrence of the local wear at the widthwise outer end portions P of the remaining ribs 19 and 20 positioned widthwise inside the narrow ribs 17 and 18, respectively, can more assuredly be prevented. When the occurrence of such local wear is prevented, uneven wear such as edge drop wear, wavy wear, shoulder drop wear, and polygonal wear at the widthwise opposite portions of the tread 2 can effectively be prevented.

FIG. 3 is a partially sectional view illustrating the second embodiment of the present invention. In this embodiment, an inclined portion 25 is provided at a widthwise outer end portion P of a remaining rib 19, 20 such that the inclined portion may come radially inwardly in a widthwise outer direction of the tire. By so doing, the ground contact pressure at the widthwise outer end portion P of the remaining rib 19, 20 is reduced and made uniform so that the occurrence of local wear can more assuredly be prevented.

FIG. 4 is a partially sectional view illustrating the third embodiment of the present invention. In this embodiment, not only the widthwise innermost narrow ribs 17 and 18 but also the narrow ribs 15 and 16 positioned widthwise outside the narrow ribs 17 and 18 are radially outwardly projected by the same amount. By so doing, the effect of preventing the uneven wear is enhanced.

FIG. 5 is a partially sectional view of illustrating the fourth embodiment of the present invention. In this embodiment, since the widthwise inner wall of the circumferential groove 12, 13 is inclined to approach the end 4, 5 of the tread in the radially outer direction of the tire, the ground contact pressure at the widthwise outer end portion P of the remaining rib 19, 20 is reduced, so that the occurrence of the local wear can more assuredly be prevented.

FIG. 6 is a partially sectional view of the fifth embodiment of the present invention. In this embodiment, circumferential grooves 11, 12, 13, 14 and narrow grooves 17 and 18 are inclined to approach the tread ends 4, 5 in the radially outer direction. By so doing, crushing stresses act in a reverse direction of wiping stresses to offset each other.

FIG. 7 is a partially sectional view of the sixth embodiment of the present invention. In this embodiment, the width A3 of the circumferential groove 12, 13 is made narrower than that A4 of the circumferential groove 11, 14. By so doing, the ground contact pressure at the widthwise outer end portion P of the remaining rib 19, 20 is reduced, so that the occurrence of the local wear can more assuredly be prevented.

FIG. 8 is a partially sectional view of the seventh embodiment of the present invention. In this embodiment, the width A of each of the circumferential grooves 11, 12, 13 and 14 is made narrower. By so doing, a rib-tear phenomenon at the end portion of the tread 2 can prevented.

FIG. 9 is a partially sectional view of the eighth embodiment of the present invention. In this embodiment, the 12, 13. By so doing, the rib-tear phenomenon at the end portion of the tread 2 in the above seventh embodiment can prevented more assuredly as compared with the seventh embodiment.

FIG. 10 is a partially sectional view of the ninth embodiment of the present invention. In this embodiment, the narrow ribs 15 and 16 positioned on widthwise outer sides of the tread are projected radially outwardly from an extension line of the contour line L of the tread. In this case, the occurrence of the local wear at the widthwise outer end portions P of the remaining ribs 19 and 20 can also assuredly be prevented.

FIG. 11 is a partially sectional view of the tenth embodiment of the present invention. In this embodiment, the widthwise outermost circumferential grooves 11 and 14 are deeper than the widthwise outermost but one circumferential grooves 12 and 13, respectively. By doing so, the strain of the bottom of the groove under application of side forces can be reduced, so that the rib tear phenomenon of the narrow ribs can be prevented.

FIG. 12 is a partially sectional view of the eleventh embodiment of the present invention. In this embodiment, the widthwise outermost circumferential grooves 11 and 14 are deeper than the widthwise outermost but one circumferential grooves 12 and 13, respectively. Furthermore, the bottom portions of the widthwise outermost circumferential grooves 11 and 14 are enlarged as shown. By so doing, the strain on the bottom of the circumferential groove under application of side forces can be reduced, so that the rib tear phenomenon of the narrow ribs can be prevented.

FIG. 13 is a partially sectional view of the twelfth of the present invention. In this embodiment, the width of the widthwise outermost but one circumferential groove 12, 13 becomes gradually smaller in the axially inner directions. By so doing, the phenomenon that the narrow rib becomes shorter during the final wearing stage is suppressed to prevent the strain of the bottom of the groove from becoming greater.

FIG. 14 is a partially sectional view of the thirteenth embodiment of the present invention. In this embodiment, a singe circumferential groove 31 is formed in each of widthwise opposite end portions of the tread 2 to define a single narrow rib 32 between the circumferential groove 31 and the tread end 4, 5, and the narrow rib 32 is projected radially outwardly from the contour line L of the tread. By so doing, the occurrence of uneven wear can be prevented by such a simple structure.

FIG. 15 is a partially sectional view of the fourteenth embodiment of the present invention. In this embodiment, under application of no load, the radially outer end of the narrow rib 17, 18 is made in flush with the extension line of the contour line L of the tread, and the circumferential grooves 11, 12, 13 and 14 and the narrow ribs 17 and 18 are inclined to approach the ends 4, 5 of the tread in the radially outer direction, so that when the narrow rib 17, 18 is laterally deformed upon receipt of lateral forces, the radially outer end of the narrow groove 17, 18 is projected radially outwardly from the extension line of the contour line L of the tread as shown by an imaginary line. By so doing, the tire can easily be molded, and the amount of rubber used can be reduced.

FIG. 16 is a partially plan view of the fifteenth embodiment of the present invention. In this embodiment, the circumferential grooves 11, 12, 13 and 14 and the narrow ribs 17 and 18 are bent zigzag. By so doing, the phenomenon that the surface of the tread is radially outwardly swelled can be dispersed so that such a phenomenon can be controlled.

FIG. 17 is a partially plan view of the sixteenth embodiment of the present invention. In this embodiment, the narrow ribs 15, 16, 17 and 18 and the remaining ribs 19 and 20 are divided into blocks by a plurality of lateral ribs 35 and 36 axially extending and spaced in the circumferential direction by an equal distance, respectively. By so doing, that share of load which is borne by a kicking-out portions of these blocks is reduced to suppress heel-and-toe wear.

FIG. 18 is a partially plan view illustrating the seventeenth embodiment. In this embodiment, the narrow ribs 15, 16, 17 and 18 as well as the remaining ribs 19 and 20 are divided into blocks by a plurality of lateral grooves 36 circumferentially spaced by an equal distance and inclined with respect to the axis of the tire, and the circumferential grooves 11, 12, 13 and 14 and the narrow ribs 17 and 18 are inclined by a given angle with respect to the circumferential direction. By so doing, that share of load which is borne by kicking-out portions of these blocks is reduced to suppress the heel-and-toe wear.

In the above-mentioned embodiments, the circumferential grooves 11, 12, 13 and 14 and the narrow ribs 15, 16, 17 and 18 are formed in the widthwise opposed end portions of the tread 2. However, in the present invention, the circumferential grooves and the narrow grooves may be formed in the end portion of the tread on one side. In such a case, the tire has only to be fitted to a vehicle such that the side of the tire on which the circumferential grooves and the narrow ribs are formed may be located on a side in which uneven wearing is likely to occur. Further, in the above-mentioned embodiments, with respect to each of the widthwise opposed sides of the tread 2, one or two of the circumferential grooves are provided, and one or two narrow ribs are defined therebetween. However, according to the present invention, three or more circumferential grooves and three or more narrow ribs may be formed in each of or one of the widthwise opposed sides of the tread.

As having been mentioned above, according to the present invention, the local wearing as the core of the uneven wear can assuredly be prevented, so that uneven wearing at the end portions of the tread can effectively be prevented.

What is claimed is:

1. A pneumatic radial tire comprising: a tread formed with at least two circumferentially extending main grooves and ribs defined between said at least two circumferential main grooves and opposite ends of the thread, each of the ribs between each of the ends of the tread and the main groove neighboring therewith includes a pair of circumferentially extending narrow grooves and a narrow rib defined by a pair of said narrow grooves and another rib defined by the end of the tread and the narrow groove neighboring therewith, said narrow grooves each having a width not greater than 0.1 times of a width of said tread, said narrow ribs having a width in the range of 0.01-0.1 times the tread width and only said narrow rib between said narrow grooves projecting radially outwardly from an extension line of a contour line of the radially outer surface of the tread in the central portion thereof by an amount no greater than 0.3 times a gauge of the tread.

2. The pneumatic tire according to claim 1, wherein said radially projection is not less than 0.02 times the gauge of the tread.

3. The pneumatic tire according to claim 1, wherein an inclined portion is provided at a widthwise outer portion of a rib defined between one of said at least two circumferentially extending main grooves and the axially inner groove of the pair of circumferentially extending narrow grooves such that the inclined portion may come radially inwardly in a widthwise outer direction of the tire.

4. The pneumatic tire according to claim 1, wherein a widthwise inner wall of the axially innermost groove of the pair of the circumferentially extending narrow grooves is inclined to approach an adjacent end of the thread in the radially outer direction of the tire.

5. The pneumatic tire according to claim 1, wherein the circumferential main groove and the narrow groove are inclined in the radially outer direction to approach the tread ends.

6. The pneumatic tire according to claim 1, wherein a width of the axially inner circumferential groove of the pair of circumferentially extending narrow grooves is narrower than that of the axially outer circumferential groove of the pair of circumferentially extending narrow grooves.

7. The pneumatic tire according to claim 1, wherein a width of a widthwise outer one of said circumferential narrow grooves is made narrower than the other narrow groove.

8. The pneumatic tire according to claim 1, wherein a width of the axially outer circumferential groove in each pair of circumferentially extending narrow grooves has a width narrower than that of the axially inner circumferential groove of the pair of circumferentially extending narrow grooves, and a ring-like space is formed axially inside the axially inner circumferentially extending narrow groove and connected to a bottom portion of the axially inner circumferential groove.

9. The pneumatic tire according to claim 1, wherein the widthwise outermost grooves in each of the pair of circumferentially extending narrow grooves has a greater depth than the widthwise innermost groove in each of the pair circumferentially extending narrow grooves.

10. The pneumatic tire according to claim 1, wherein the widthwise outermost grooves in each of the pair of circumferentially extending narrow grooves has a greater depth than the widthwise innermost groove in each of the pair circumferentially extending narrow grooves, and the bottom portions of the widthwise outermost grooves in each of the pair of circumferentially extending narrow grooves are enlarged.

11. The pneumatic tire according to claim 1, wherein the width of the widthwise innermost groove in each of the pair circumferentially extending narrow grooves becomes gradually smaller in the axially inner direction.

12. The pneumatic tire according to claim 1, wherein the circumferentially extending narrow grooves and the narrow rib defined by said pairs of narrow grooves are bent zigzag.

13. The pneumatic tire according to claim 1, wherein the ribs between each of the ends of the tread and the main groove neighboring therewith, including said formed narrow ribs are divided into blocks by a plurality of lateral grooves which are axially extending and spaced in the circumferential direction by an equal distance, respectively.

14. The pneumatic tire according to claim 1, wherein the ribs between each of the ends of the tread and the main groove neighboring therewith, including said formed narrow ribs are divided into blocks by a plurality of lateral grooves circumferentially spaced by an equal distance and inclined with respect to the axis of the tire, and the pairs of circumferentially extending narrow grooves and the narrow rib defined by said pair of narrow grooves are inclined by a given angle with respect to the circumferential direction.

* * * * *